United States Patent [19]

Schultz

[11] Patent Number: 5,216,365

[45] Date of Patent: Jun. 1, 1993

[54] APPARATUS FOR MEASURING DYNAMIC SAW BLADE FLUTTER

[76] Inventor: David A. Schultz, Rte. 2, Box 364, Newton, N.C. 28658

[21] Appl. No.: 788,170

[22] Filed: Nov. 5, 1991

[51] Int. Cl.$^5$ .......................... G01B 7/28; G01B 7/14; G01P 3/48
[52] U.S. Cl. .................... 324/226; 324/174; 324/207.20; 324/207.25; 324/207.26
[58] Field of Search .................. 324/207.20, 234, 235, 324/247, 233, 207.25, 207.26

[56] References Cited

U.S. PATENT DOCUMENTS

| | | | |
|---|---|---|---|
| 4,005,358 | 1/1977 | Foner | 324/233 |
| 4,013,946 | 3/1977 | Lewis | 324/247 |
| 5,036,274 | 7/1991 | Seeburger | 324/207.16 |

FOREIGN PATENT DOCUMENTS 2197483  5/1988  United Kingdom ........... 324/207.14

Primary Examiner—Gerard R. Strecker
Assistant Examiner—Warren S. Edmonds
Attorney, Agent, or Firm—John P. Halvonik

[57] ABSTRACT

The invention relates to an apparatus for implementing the automatic measurement of a spinning saw blade's lateral deformation or deflection otherwise known as "flutter." The apparatus comprises a mounting means for rotating the saw blade and a detector means for measuring the flutter of the saw blade and generating an electrical signal in response. A second means measures the spin of the rotating saw blade in order to provide a visual output signal indicating flutter as a function of rotational speed.

2 Claims, 6 Drawing Sheets

APPARATUS FOR MEASURING DYNAMIC SAW BLADE FLUTTER

BACKGROUND OF THE INVENTION

1. Field of the Invention

Flutter is a lateral deflection or deformation that occurs in a spinning body (in this case a saw blade). When saw blades are improperly serviced or mounted, this phenomenon is most easily evidenced by the blade producing a swath or path through the material being cut which is wider than the blade's kerf or tooth width.

A saw blade, when rotated is acted upon by centrifugal force. This force creates the tendency to make matter move away from the center of rotation. The matter, in this case, a blade, will continue to increase in diameter until all centrifugally produced force has been dissipated or until the blade's inherent (tensile) strength prevents further outward movement of the material being acted upon. Tensile strength can most easily be described as the amount of attraction or gripping power one molecule has towards its neighboring molecules within a given material. In cases where centrifugal force (energy) has not been totally dissipated through the blade's growth and tensile strength prevents additional expansion, an alternate route of dissipation will be taken. The next least resistant route to equilibrium is laterally and deflection or flutter occurs.

The key to preventing saw blade flutter at operational speeds is to manually elongate the circumference in a specified portion of the saw blade body to a length greater than the normal pi×diameter=circumference equation would yield. The location of this artificially elongated circumference will either increase or decrease the blade's ability to dissipate centrifugally produced energy in relationship to the speed at which tensile strength would prevent further growth. When this manual deformation or elongation is correctly performed, all centrifugally produced energy will, through stretching, be dissipated at or slightly below the saw blade's operational speed (rpm's). Because all energy would be dissipated at or near operational speeds, no alternate route to equilibrium would be required and the saw blade would operate without flutter. Industry jargon refers to this phenomenon as a blade growing into itself or "snap-out".

The afore-mentioned deformation or manual elongation is performed by a process known as "roll tensioning". A roll tensioning machine consists of two (2) crowned wheels which are configured to oppose each other. The saw blade's body is positioned between these wheels at a predetermined location and the wheels are then moved towards each other via: a manual or motorized screw jack to exert a specific pressure. The blade is then slowly rotated and the portion of the blade which passes between the wheels is compressed and thereby elongated.

Prior to performing the afore-mentioned roll tensioning, a determination must be made as to where it will be placed and how much pressure will be applied. If a blade reaches its point of equilibrium below the operational speed (rpm's) of the sawing machine on which it is to be used, the blade's periphery is too short and it has grown into itself prematurely. The introduction of additional rpm's will cause the blade to flutter due to its inability to stretch any further. This condition indicates the need for an elongating tension roll as near to the blade's periphery as possible.

If rpm's above that of the sawing machine's operational speed are required for the blade to reach a point of equilibrium its periphery is too long and it will never achieve equilibrium in its present condition. There are not enough rpm's available to make it happen. Since roll tensioners cannot shorten an overly elongated circumference, an interior (nearer the blade's bore) roll must be applied to reestablish the correct relative circumference between the blade's interior portion and exterior portion. Interior being towards the bore and exterior being towards the periphery. Outside forces such as fatigue, metallurgical make-up, etc. make it necessary to perform numerous evaluations and corrective actions during the life of a saw blade.

Tensile strength is best described as that property any material in question has to remain attracted to its self or its degree of molecular adhesion.

Current state of the art requires that an experienced hammersmith utilize judgment based on years of experience to determine to what degree a saw blade will expand when transitioned from the static to the dynamic state. The hammersmith utilizes what he knows about material strength, fatigue, etc. from his past experiences in a effort to determine the amount and location of roller tension induced deformation required to make the blade's point of equilibrium or snap out coincide with the operational speed of the sawing machine being used. Current art relies solely on judgment calls which generally vary from hammersmith to hammersmith. Since current art does not afford exacting measurements, it is truly an art form and not a scientific process.

Amounts of flutter and the speeds at which they occur vary widely from blade to blade due to some and possibly all of the following factors:

Variances in rpm's
Variances in metallurgical make-up
Variances in heat treating during production
Variances in fatigue induced hardness
Variances in tensioning
Variances in amounts of operationally induced heat Some of the determination to be made by the hammersmith prior to preparing a blade for operation are as follows:

1) How much a blade's static circumference must be increased or its relative circumference decreased to produce a state of equilibrium at operational speeds.

2) To what degree a blade is fatigued and to what degree this will reduce its ability to expand when acted upon by centrifugal force 3) At what rotational speed is the blade currently reaching its point of equilibrium.

4) Can this blade be made to run harmoniously with a multitude of other blades on a common arbor in spite of their different operational characteristics?

The above noted variances and required determinations are not intended to be all-inclusive.

SUMMARY OF INVENTION

The invention relates to a system and apparatus for measuring the amount of flutter a saw blade exhibits when dynamic. Also measured are the rotational speeds at which these varying amounts of flutter occur. The apparatus utilizes a computerized system which collates data that corresponds to rpm and deformation (flutter) and plots this in terms of a usable digital readout. The computer may also be used to store data from previous evaluations in order to develop accessible histories to aide in determining proper corrective actions for blades currently being evaluated. The system utilizes a proximity sensor located near the blade's and mounted perpendicular to the plane of the blade. This sensor in concert with additional apparati provides access of up to 4000 deformation measurements per second in both the positive and negative. A pulse generator which incorporates a Hall-effect transistor is mounted on the aft end of machine's rotational arbor on which blades to be evaluated are to be mounted. Both sensor measured distances and Hall-effect transistor measured rpm's may be fed into the computer, which in turn provides a real time display in both digital and bar graph readouts. Additional channel selections programmed into the system provide:

1) Lateral flutter to the right only at a given rpm (negative)
2) Lateral flutter to the left only at a given rpm (positive)
3) Total of all lateral flutter at a given rpm (negative & postive)

It is the object of the invention to provide an automatic and repetitively accurate method of measuring the behavioral characteristics of a saw blade while dynamic and thereby eliminating the static guess work currently being practiced.

Additional objectives of this invention are to provide the means by which saw blade users can realize the following:

1) Determine actual usable saw blade inventory on hand by having the knowledge of to what degree their blades have been exhausted through fatigue.
2) To reduce saw blade kerfs which equates to higher product yields (blades which run true need not possess as much inherent strength as those that don't)
3) To increase productivity by reducing down time caused by blade failure
4) To realize an increase in blade life by eliminating fatigue causing flutter
5) Via: computer stored histories, make more informed new blade purchase decisions.

Other advantages of the invention should be readily apparent to those skilled in the art, once the invention has been described.

DESCRIPTION OF THE PREFERRED EMBODIMENT

Figure 1:
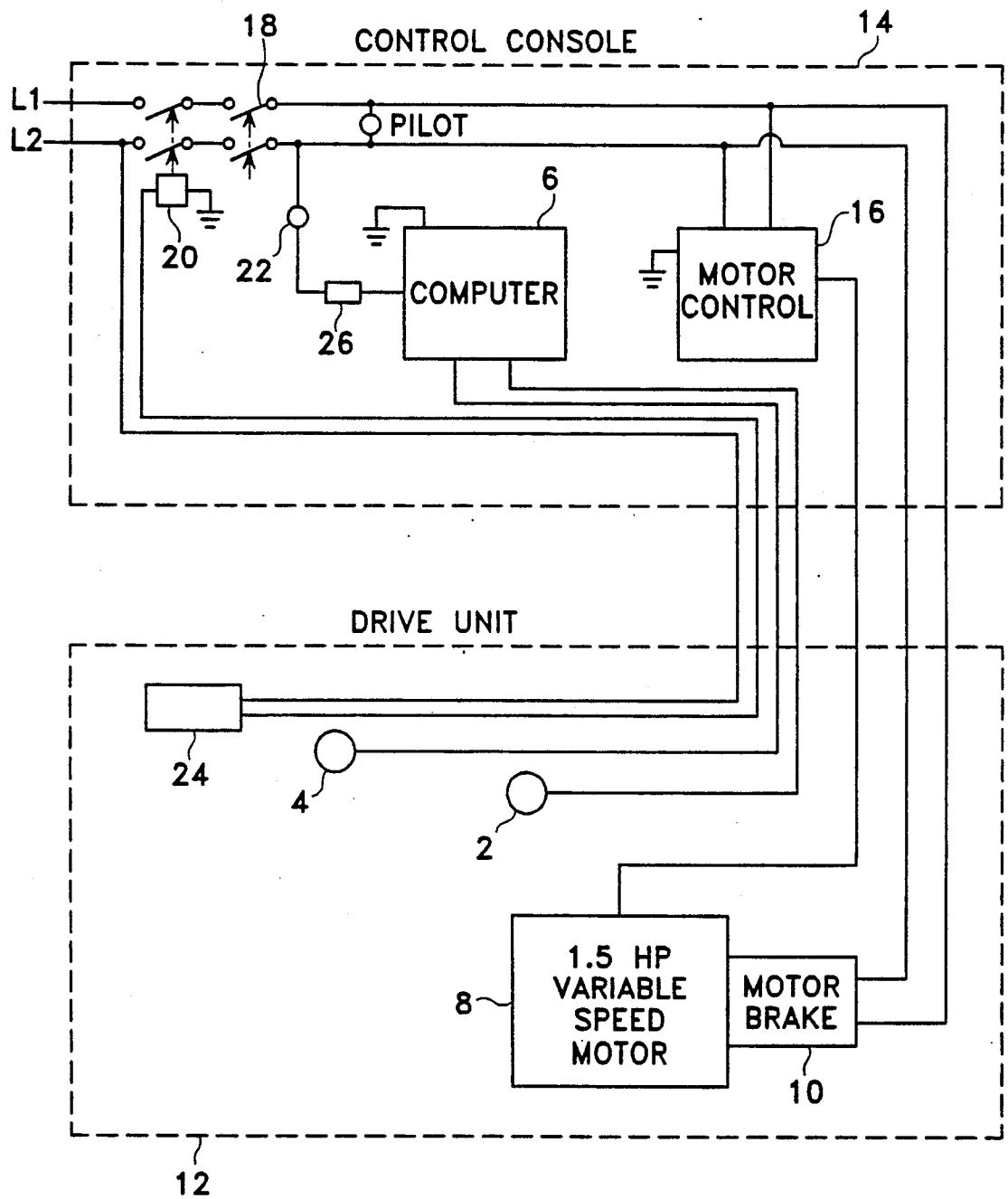
FIG. 1 shows the overall set-up of the flutter measuring system

The overall set-up of the system is shown in the configuration shown as FIG. 1. An inductive sensor system 2 is used to measure the proximity of the saw blade's body surface 1 as near as practical to its periphery. The electrical signal generated in response thereto, is then sent to a computer 6 via: a coaxial cable. The motor 8 which drives the machine's arbor is also shown as FIG. 1.

The sensing system of the present set-up uses a non-contacting type of proximity sensor eg. the ones sold by the Electro Corporation and known as the EMDT system (trademarked name). In these types of devices, a low level radio frequency field is generated in front of the sensor. This radio field generates eddy currents in any metal target (which in this case, would be the saw blade) which the field intercepts. In this way the distance measured can be converted into an electrical signal without having to contact the moving saw blade.

This type of sensing system finds particular utility in the apparatus of the present invention since these sensors are designed to perform multiple readings of a mechanical dimension at high speed without contact with the surface of the body being measured.

Induction proximity sensors produced by, but not limited to, the Electro Corporation may be used in this system. Some typical Electro model numbers would be 85002, 85003, and 85012 proximity sensors. Of course, other sensors could be used and still be considered to be within the scope of this invention. Sensors that maybe used are chosen to be able to provide multiple proximity readings over a short period of time. Typical readings measure the proximity at a rate of between 1000 to 4000 times per second.

The sensor should be placed perpendicular to the plane of the saw blade and as near to the blade's periphery as practical while assuring that the sensor's face falls at least ¼" inside the lower gullet line 3.

The sensor housing is mounted on dual precision cylindrical ways allowing the positioning flexibility required to accommodate blades with diameters from 12" to 36".

Contained with the sensor housing is a vernier feed which is required to ascertain proper sensor face to blade distance when performing initial machine set-up.

The invention is comprised of two (2) major components, one being the drive unit and the other being the control console. There is a motor and controller 16 for the system to spin the saw blade. There is also a motor brake 8 in connection with the motor to stop the system when necessary.

The drive unit 12 is the portion of the system on which the saw blade is mounted and contains the following:

1) variable speed D.C. motor 8
2) electro-magnetic brake 10
3) Hall effect transistor type pulse generator 4
4) blade safety cage with door
5) door open/kill and brake mechanism 24
6) proximity sensor and related mounting and adjustment mechanisms The above is connected to a remote control console 14 via: a sheathed umbilical.

The control console contains the following:
1) master switch
2) power on indicator light
3) fusing for all components
4) motor controls
5) tachometer
6) POM (series I only) IBM compatible computer (series II only)
7) keyboard on series II only 8) storage areas It is assumed that different layouts of the accompanying system may be used without varying from the spirit of the invention. That shown here is merely preferred, based on what experimental usage of the system indicates is best.

Further details of the control layout include the pulse generator 4 shown as part of the drive unit and a surge protector 26 located in connection with the computer.

Figure 2:
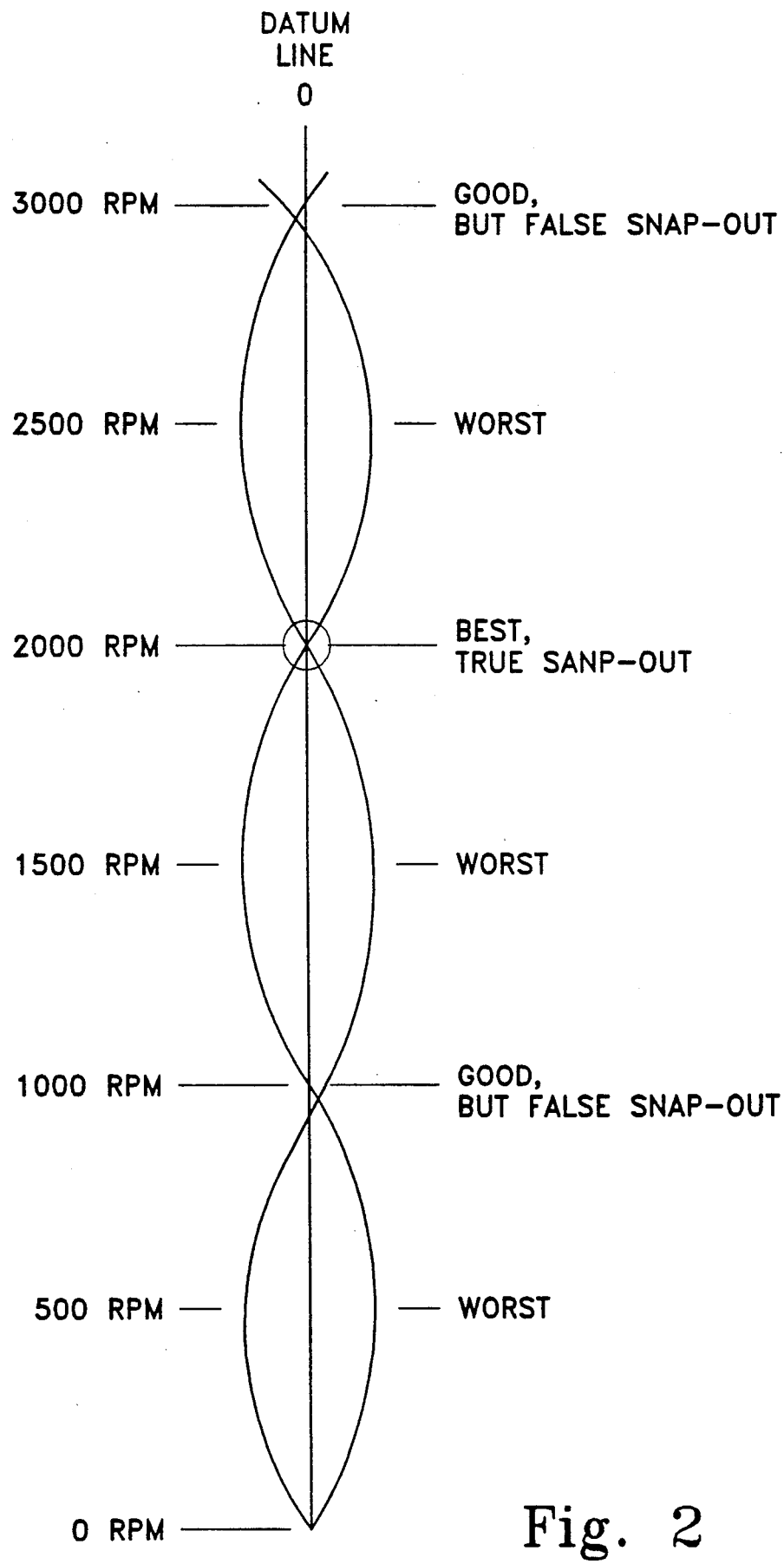
FIG. 2 shows a plot of blade deformation versus rpm for a typical graphical readout of a dynamic saw blade.
Figure 3A:
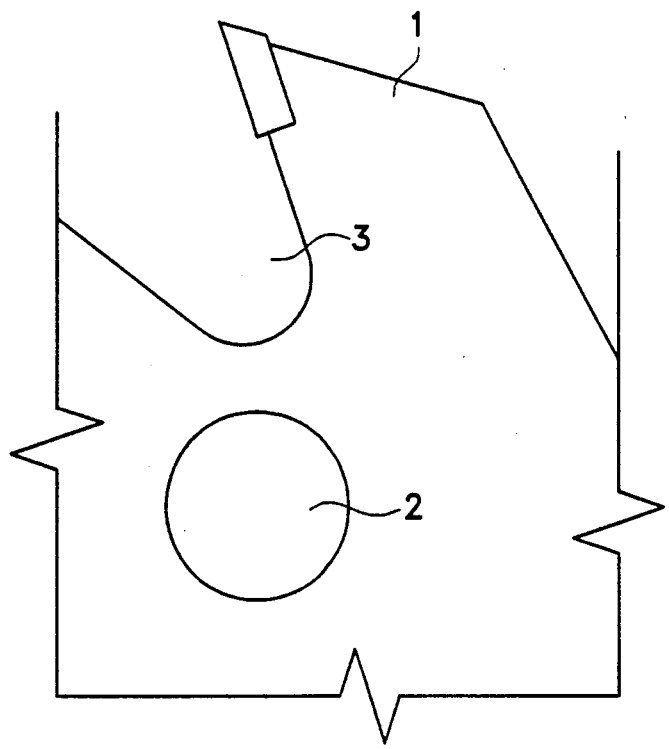
FIG. 3A Preferred position of sensor vis a vis blade.
Figure 3B:
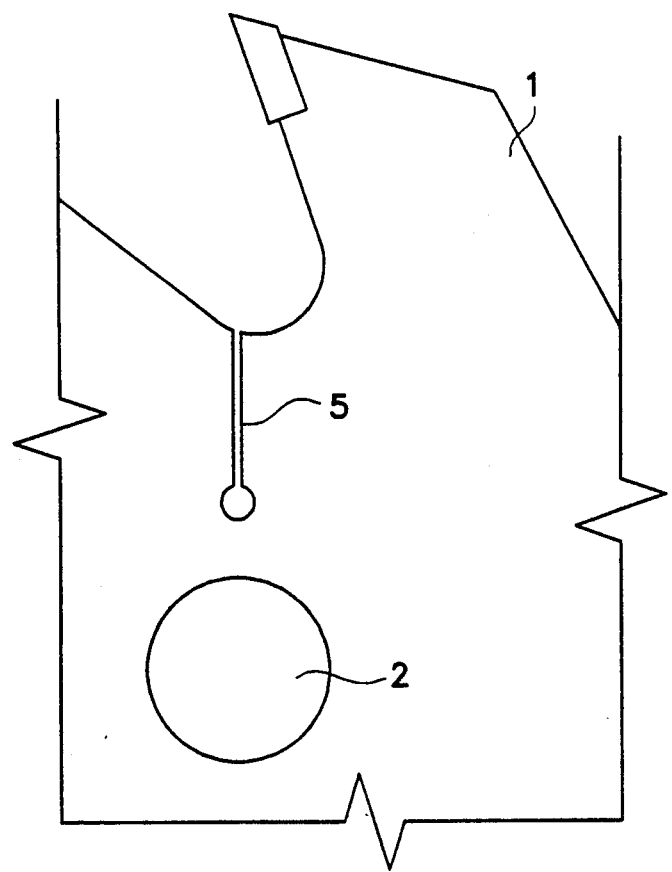
FIG. 3B Preferred position of sensor with blade having an expansion slot.
Figure 4:
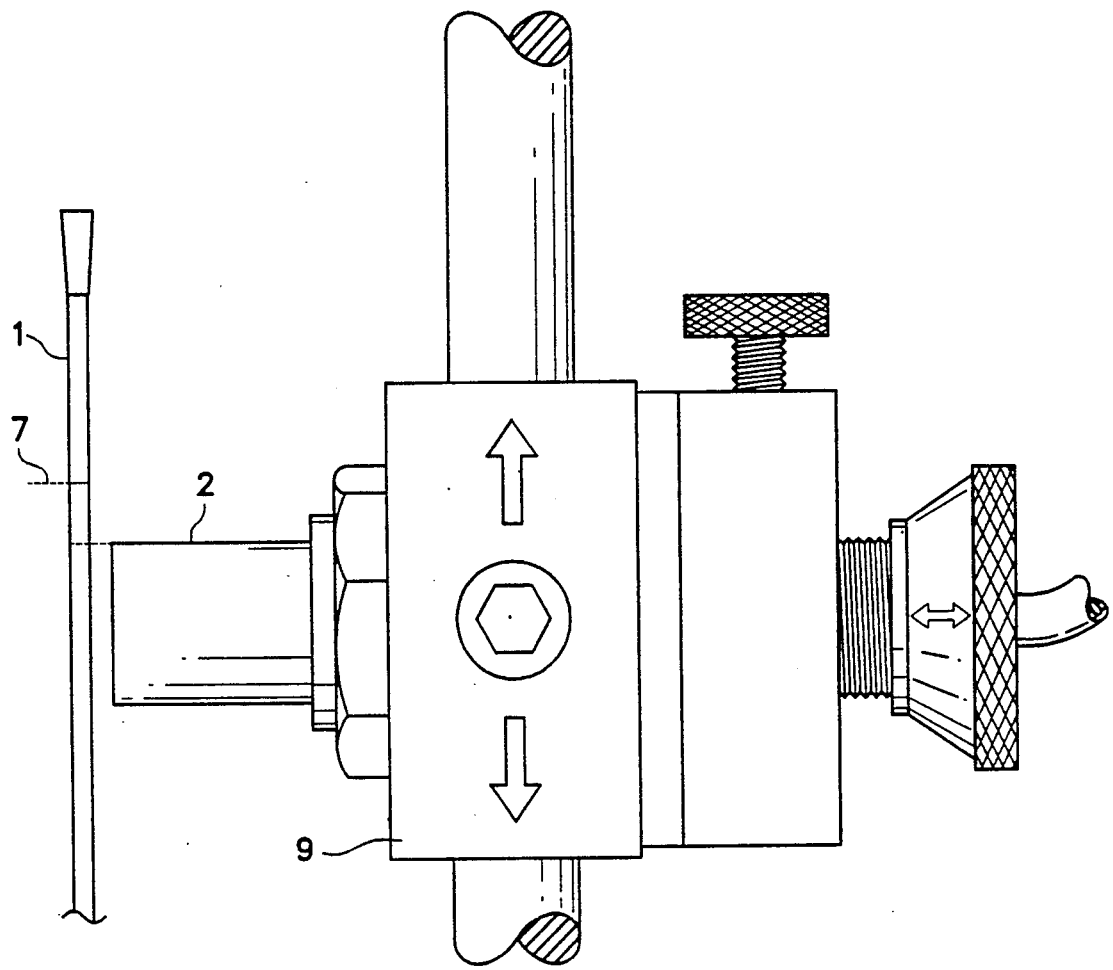
FIG. 4 Side view of sensor and blade mounting.
Figure 5:
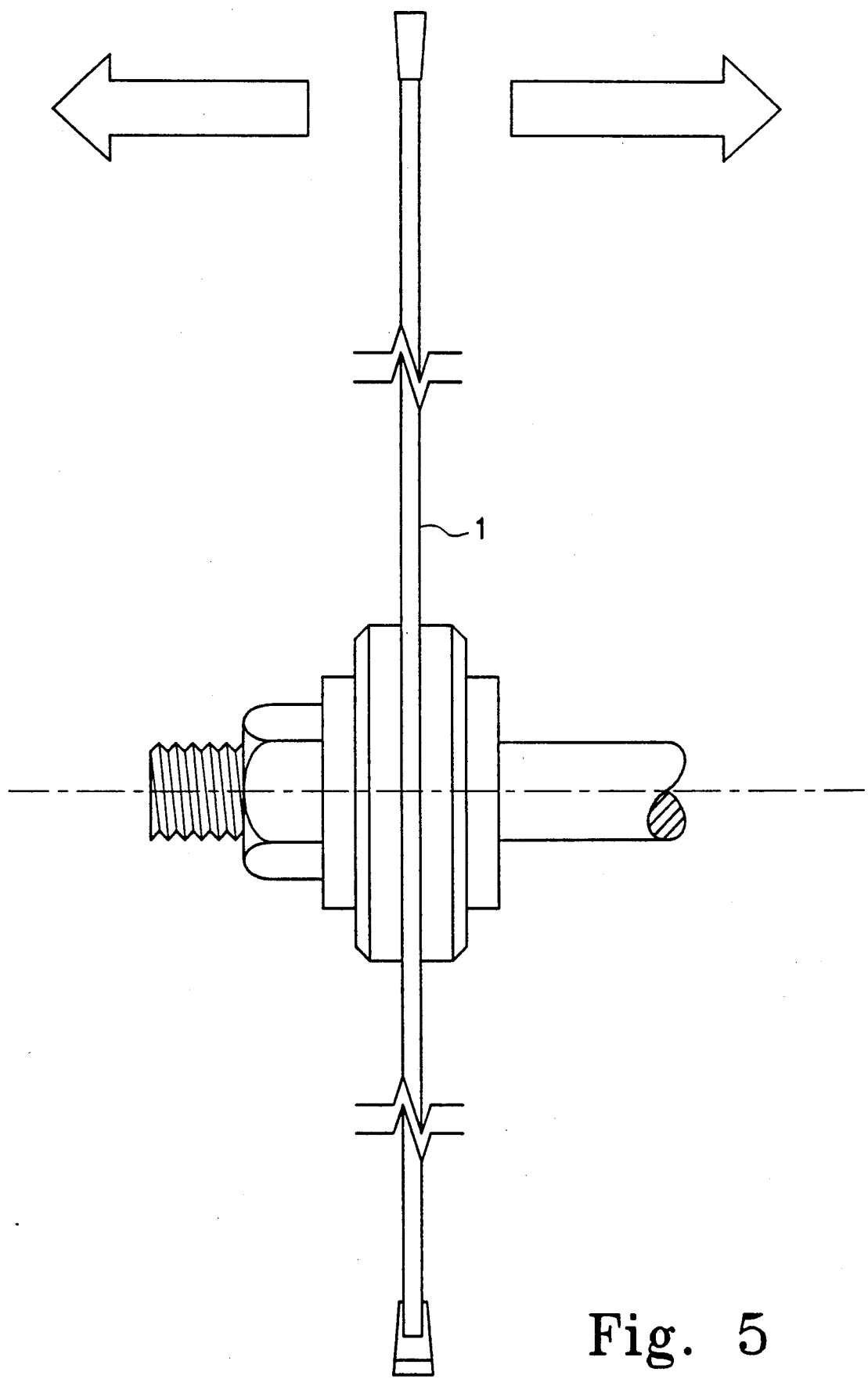
FIG. 5 Side view of blade showing direction of blade flutter.
Figure 6A:
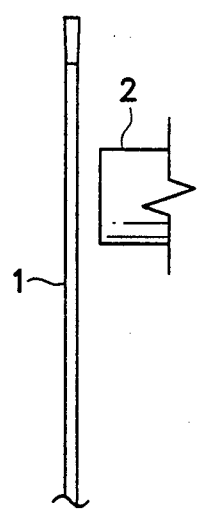
FIG. 6A Sensor vis a vis blade with no deformation.
Figure 6B:
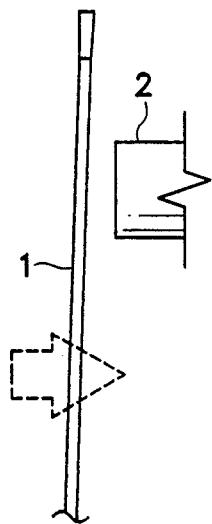
FIG. 6B Sensor vis a vis blade with deformation toward sensor.
Figure 6C:
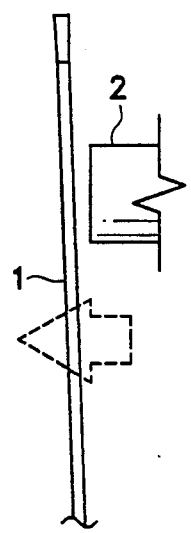
FIG. 6C Sensor vis a vis blade with deformation away from sensor.

The rotational speed of the arbor (in terms of rpm's) is measured by the Hall-effect device which is fastened to the aft end of same. The Hall-effect device is also known as a magnetic pulse generator as shown in FIG. 1. The Hall-effect device generates electrical impulses in connection with each revolution, this signal is then sent to the tach. or computer. At the same time, the proximity sensor transmits 1000 to 4000 readings per second to the computer or PDM. The proximity signal can then be processed and deflection as a function of rpm can be displayed and/or stored, see FIG. 2.

I claim:

1. An apparatus for measuring axial saw blade flutter in a dynamic saw blade comprising: mounting means for securing and rotating said saw blade so as to create a plane of movement running through said mounting means and corresponding to said rotational movement of said saw blade, said saw blade having a gullet line located on the periphery of said saw blade, said gullet line corresponding to the curved cutting portions on the periphery of said blade, detector means located on one side of said plane and directed at said blade at a point interior of said gullett line, said detector means for measuring the movement of said saw blade above and below said plane of movement and generating an electric signal corresponding to said movement, spin measuring means in connection with said mounting means for determining the speed of revolution of said saw blade, output means in connection with said detector and said spin measuring means for providing a visual output signal indicative of the amount of flutter as a function of the speed of said saw blade.

2. The apparatus of claim 1 wherein said spin measuring means comprising a Hall-effect device that generates electrical impulses corresponding to each revolution of said saw blade.

* * * * *